(12) United States Patent
Xu et al.

(10) Patent No.: US 11,434,543 B2
(45) Date of Patent: Sep. 6, 2022

(54) METHOD FOR EXTRACTING AND ENRICHING GOLD WITH SELENIDE

(71) Applicant: Tsinghua University, Beijing (CN)

(72) Inventors: Huaping Xu, Beijing (CN); Yiheng Dai, Beijing (CN); Wentian Xiang, Beijing (CN); Ke Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 280 days.

(21) Appl. No.: 16/992,543

(22) Filed: Aug. 13, 2020

(65) Prior Publication Data
US 2021/0130923 A1    May 6, 2021

(30) Foreign Application Priority Data
Oct. 31, 2019   (CN) .......................... 201911049189.2

(51) Int. Cl.
| | |
|---|---|
| C22B 3/24 | (2006.01) |
| B01J 20/22 | (2006.01) |
| B01J 20/28 | (2006.01) |
| B01J 20/30 | (2006.01) |
| C22B 11/00 | (2006.01) |

(52) U.S. Cl.
CPC .............. C22B 3/24 (2013.01); B01J 20/226 (2013.01); B01J 20/28054 (2013.01); B01J 20/3028 (2013.01); B01J 20/3078 (2013.01); C22B 11/04 (2013.01)

(58) Field of Classification Search
CPC ......... C22B 3/24; C22B 11/04; C22B 11/046; C22B 7/006; C22B 7/001; C22B 11/021; C22B 11/042; B01J 20/226; B01J 20/28054; B01J 20/3028; B01J 20/3078; Y02P 10/20
See application file for complete search history.

(56) References Cited

U.S. PATENT DOCUMENTS 3,816,317 A * 6/1974 MacArthur ............... C23F 1/40
252/79.3

OTHER PUBLICATIONS

Kulandaisamy et al (The Aqueous Recovery of Gold from Electronic Scrap, JOM, 2003) (Year: 2003).*
Rao et al (Challenges and opportunities in the recovery of gold from electronic waste, Royal Society of Chemistry, Jan. 27, 2020) (Year: 2020).*

* cited by examiner

*Primary Examiner* — Anthony J Zimmer
*Assistant Examiner* — Logan Edward Laclair
(74) *Attorney, Agent, or Firm* — Hodgson Russ LLP (57) ABSTRACT

A method for extracting and enriching gold with a selenide includes: mixing an isocyanate and a selenium-containing compound of a formula of HO—R—Se—R—OH in a solvent to obtain a mixture system, where R is selected from linear or branched $C_2$ to $C_{11}$ alkylene groups; adding a tin-based catalyst into the mixture system to activate a reaction, drying the mixture system after the reaction, and obtaining a powdery selenium-containing polymer by grinding; immersing the selenium-containing polymer in an aqueous solution containing gold ions to allow gold to be extracted from the aqueous solution; and removing the selenium-containing polymer attached to a surface of extracted gold, thereby obtaining an extracted and enriched gold.

20 Claims, 5 Drawing Sheets

METHOD FOR EXTRACTING AND ENRICHING GOLD WITH SELENIDE

CROSS-REFERENCE TO RELATED APPLICATION

This application claims priority to Chinese Patent Application No. 201911049189.2, filed Oct. 31, 2019, the entire disclosure of which is incorporated herein by reference.

TECHNICAL FIELD

The present disclosure relates to a field of extracting and enriching noble metals, and particular to a method for extracting and enriching gold with a selenide.

BACKGROUND

Cyanide extraction method and organic phase extraction method are commonly used for extracting Au from electronic waste. However, the cyanide extraction method will produce highly toxic cyanide waste during operations, thus being harmful to the environment. The organic phase extraction method requests a large amount of organic solvents during operations, resulting in a complex post-treatment for removing the organic solvents. Moreover, in addition to Au, electronic waste may contains a large amount of other metals, such as copper and nickel, which causes difficulties for the existing methods in extracting and enriching gold.

Therefore, there is still an urgent need for providing a method for efficiently, conveniently, environmentally-friendly and selectively recovering Au from the electronic waste.

SUMMARY

The present disclosure seeks to solve at least one of the problems that exist in the related art to at least some extent. Accordingly, an object of the present disclosure is to provide a method for extracting and enriching gold.

In an aspect, the present disclosure provides in embodiments a method for extracting and enriching gold with a selenide, comprising: mixing an isocyanate and a selenium-containing compound of a formula of HO—R—Se—R—OH in a solvent according to a mass ratio of the isocyanate to the selenium-containing compound of (0.2 to 2):1 to obtain a mixture system with a mass concentration of the selenium-containing compound of 0.1 to 1 g/mL, where R is selected from linear or branched $C_2$ to $C_{11}$ alkylene groups; adding a tin-based catalyst in an amount of 20 to 100 μL per 1 g of the selenium-containing compound into the mixture system to activate a reaction, drying the mixture system after the reaction, and obtaining a powdery selenium-containing polymer by grinding; immersing the selenium-containing polymer in an aqueous solution containing gold ions to allow gold to be extracted from the aqueous solution; and removing the selenium-containing polymer attached to a surface of extracted gold, thereby obtaining an extracted and enriched gold.

In another aspect, the present disclosure provides in embodiments a method for extracting and enriching gold with a selenide, comprising: mixing an isocyanate, a selenium-containing compound of a formula of HO—R—Se—R—OH and a crosslinking agent in a solvent according to a mass ratio of the isocyanate, the selenium-containing compound and the crosslinking agent of (0.6 to 3):1:(0.2 to 1) to obtain a mixture system with a mass concentration of the selenium-containing compound of 0.1 to 1 g/mL, where each R is selected from linear or branched $C_2$ to $C_{11}$ alkylene groups; adding a tin-based catalyst in an amount of 20 to 100 μL per 1 g of the selenium-containing compound into the mixture system to activate a reaction, and obtaining a selenium-containing porous material after the reaction; immersing the selenium-containing porous material in an aqueous solution containing gold ions to allow gold to be extracted from the aqueous solution; and removing the selenium-containing porous material attached to a surface of the extracted gold by calcination for 2 to 5 h, thereby obtaining an extracted and enriched gold.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Embodiments of the present disclosure are described in detail below, examples of which are illustrated in the drawings. The embodiments described herein with reference to drawings are explanatory, and used to generally understand the present disclosure. The embodiments shall not be construed to limit the present disclosure.

The present disclosure provides in embodiments a method for extracting and enriching gold with a selenide, comprising: mixing an isocyanate and a selenium-containing compound of a formula of HO—R—Se—R—OH in a solvent according to a mass ratio of the isocyanate to the selenium-containing compound of (0.2 to 2):1 to obtain a mixture system with a mass concentration of the selenium-containing compound of 0.1 to 1 g/mL, where R is selected from linear or branched $C_2$ to $C_{11}$ alkylene groups; adding a tin-based catalyst in an amount of 20 to 100 μL per 1 g of the selenium-containing compound into the mixture system to activate a reaction, drying the mixture system after the reaction, and obtaining a powdery selenium-containing polymer by grinding; immersing the selenium-containing polymer in an aqueous solution containing gold ions to allow gold to be extracted from the aqueous solution; and removing the selenium-containing polymer attached to a surface of extracted gold, thereby obtaining an extracted and enriched gold.

In another aspect, the present disclosure provides in embodiments a method for extracting and enriching gold with a selenide, comprising: mixing an isocyanate, a selenium-containing compound of a formula of HO—R—Se—R—OH and a crosslinking agent in a solvent according to a mass ratio of the isocyanate, the selenium-containing compound and the crosslinking agent of (0.6 to 3):1:(0.2 to 1) to obtain a mixture system with a mass concentration of the selenium-containing compound of 0.1 to 1 g/mL, where each R is selected from linear or branched $C_2$ to $C_{11}$ alkylene groups; adding a tin-based catalyst in an amount of 20 to 100 μL per 1 g of the selenium-containing compound into the mixture system to activate a reaction, and obtaining a selenium-containing porous material after the reaction; immersing the selenium-containing porous material in an aqueous solution containing gold ions to allow gold to be extracted from the aqueous solution; and removing the selenium-containing porous material attached to a surface of the extracted gold by calcination for 2 to 5 h, thereby obtaining an extracted and enriched gold.

In some embodiments of the present disclosure, R is selected from any group of —$CH_2CH_2$—, —$CH_2CH_2CH_2$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$— and —$(CH_2)_{11}$—.

In some embodiments of the present disclosure, the isocyanate is selected from any one of toluene diisocyanate, hexamethylene diisocyanate, methylenediphenyl diisocyanate and isophorone diisocyanate.

In some embodiments of the present disclosure, the solvent is selected from any one or more of dichloromethane, acetone, tetrahydrofuran, diethyl ether, n-hexane and n-pentane.

In some embodiments of the present disclosure, the crosslinking agent is selected from any one or more of glycerine, triethanolamine and pentaerythritol.

In some embodiments of the present disclosure, the tin-based catalyst is selected from any one or more of dibutyltin dilaurate, stannous octoate, dibutyltin diacetate and bis(dodecylthio)dibutyltin.

In some embodiments of the present disclosure, the aqueous solution containing gold ions is selected from a chloroauric acid solution or a CPU circuit board leaching solution.

In some embodiments of the present disclosure, the selenium-containing compound of the formula of HO—R—Se—R—OH is prepared by: providing a selenium powder and sodium borohydride in a reaction device, and adding absolute ethanol in the reaction device for reaction until no gas is generated; introducing nitrogen to remove the gas in the reaction device; dissolving a bromine-substituted alkyl alcohol into tetrahydrofuran to obtain a bromine-substituted alkyl alcohol solution; injecting the bromine-substituted alkyl alcohol solution into the reaction device to allow a reaction to be performed at 50° C. for 8 h to obtain the selenium-containing compound; and purifying the selenium-containing compound.

In some embodiments of the present disclosure, the method for extracting and enriching gold with a selenide further include: stirring the mixture system at 1000 r/min for a period of 1 min to 30 min.

In some embodiments of the present disclosure, gold extraction is performed at 37° C. in a constant temperature shaker in the dark for 24 h.

In some embodiments of the present disclosure, removing the selenium-containing polymer attached to the surface of the extracted gold comprises: placing the extracted gold in tetrahydrofuran; and performing an ultrasonic vibration to dissolve the selenium-containing polymer attached to the surface of the extracted gold to obtain a high-purity gold.

In some embodiments of the present disclosure, the calcination is performed in a muffle furnace at a temperature of 550 to 1000° C.

With the method for extracting and enriching gold with the selenide according to embodiments of the present disclosure, the problems that exist in the related art as described above may be solved to at least some extent. In the present disclosure, different synthesis methods are adopted to prepare the selenium-containing compound in a way that the chemical structure of the selenium-containing compound can be controlled. The selenium-containing material prepared in the present disclosure is capable for Au reduction and enrichment in the electronic waste solution including multiple metal ions in an environmental-friendly, high-efficiency and high-selectivity way.

The material used for Au recovery in the present disclosure has a selenium ether structure, which exhibits reducibility and coordination effect. The reducibility allows gold ions to be selectively reduced (into elementary gold) from the system containing different ions. The coordination effect allows the extracted gold to be enriched on the surface of the material. Further, the material may has a porous structure which effectively increases the specific surface area of the material, thus improving the reduction and coordination reactions in view of reaction kinetics to quickly enrich gold within the porous structure of the material. In addition, the material may have a polymer backbone which is suitable for functionalization, reaction process and post-treatment of the material.

In the present disclosure, a small molecule compound containing selenium is prepared first, and its structure can be determined by $^1$H-NMR and $^{13}$C-NMR. Subsequently, the small molecule compound may be reacted with the isocyanate in a one-pot method to obtain the final selenium-containing material. The final material can be used in the multi-component electronic waste solution to selectively reduce and enrich gold in a very simple condition where the material is only required to be immerged into the waste solution. Therefore, the final material prepared in the embodiments of the present disclosure has advantages of high capacity, high efficiency and high selectivity. Inductively coupled plasma mass spectrometry data may show the change in Au concentration with time. Further, the final material may have a porous structure, and after gold recovery, the material adsorbed with gold may be calcined, e.g., in a muffle furnace, to obtain high-purity gold. The method of the present disclosure may be used in different applications. For example, for treating a solution containing ionic gold together with toxic and harmful substances, the solution can be processed with several pieces of selenium containing porous materials respectively for a frequent treatment, thus reducing the total treating time. For another example, for treating a solution containing ionic gold with a low concentration, the material of the present disclosure can be used for a long-term to achieve better efficiency compared with the existing methods.

In addition, compared with the existing methods, the method of the present disclosure is easy to operate, the reduction and enrichment of gold may be realized simultaneously, and there is no need for introducing toxic cyanide or organic solvent into the post-treatment process. Therefore, the present method is environmentally friendly and thus may be widely applied.

The method of the present disclosure will be described in detail with reference to the following examples.

It should be noted that, reagents used in the following examples are commercially available or can be synthesized according to the present disclosure or known methods in the art, and reaction conditions not specifically disclosed belong to technical means which are obtainable by those skilled in the art.

Examples 1 to 4: Extracting and Enriching Gold Based on a Selenium-Containing Polymer Prepared from a Compound of $HO-(CH_2)_{11}-Se-(CH_2)_{11}-OH$ and Isocyanate Example 1

(1) 0.414 g of toluene diisocyanate (TDI) and 1.00 g of $HO-(CH_2)_{11}-Se-(CH_2)_{11}-OH$ were added into a 40 mL reaction flask, and 2 mL of dichloromethane was further added and mixed uniformly to obtain a mixture system. The compound of $HO-(CH_2)_{11}-Se-(CH_2)_{11}-OH$ was prepared as follows.

0.45 g of selenium powder and 1.80 g of sodium borohydride were added to a 250 mL round bottom flask, and 5 mL of absolute ethanol was added slowly and dropwise into the flask in an ice-water bath. After the reaction was moderated, 15 mL of absolute ethanol was added slowly and dropwise. After the reaction system stopped generating gas, the flask was sealed with a rubber stopper, and nitrogen was introduced into the system for 3 min to remove the gas in the flask. After this, a brownish gray transparent solution was obtained and stood at room temperature for use. 2.70 g of 11-bromo-1-undecanol (10.70 mmol) was dissolved in 20 mL of tetrahydrofuran to obtain an 11-bromo-1-undecanol solution. With stirring, the prepared 11-bromo-1-undecanol solution and additional 10 mL of tetrahydrofuran were injected into the brownish gray transparent solution in sequence, and heated for reaction at 50° C. for 8 h. After the reaction, the reaction device was cooled to room temperature, ethanol and tetrahydrofuran were removed by rotary evaporation, and dichloromethane and deionized water were added to the remaining mixture. The mixture was separated to collect organic phase. The aqueous phase was washed with dichloromethane until colorless, and the organic phase solutions were combined. Anhydrous sodium sulfate was added for drying and removed by filtration, and dichloromethane was removed by rotary evaporation. A small amount of tetrahydrofuran was added to the remaining material, and heated to dissolve the remaining material to obtain a mixture liquid. The mixture liquid was added dropwise to 100 mL of icy petroleum ether, and recrystallized to obtain a pale yellow solid. The solvent was removed by suction filtration, and the solid was dried to obtain the compound of $HO-(CH_2)_{11}-Se-(CH_2)_{11}-OH$.

Figure 1A:
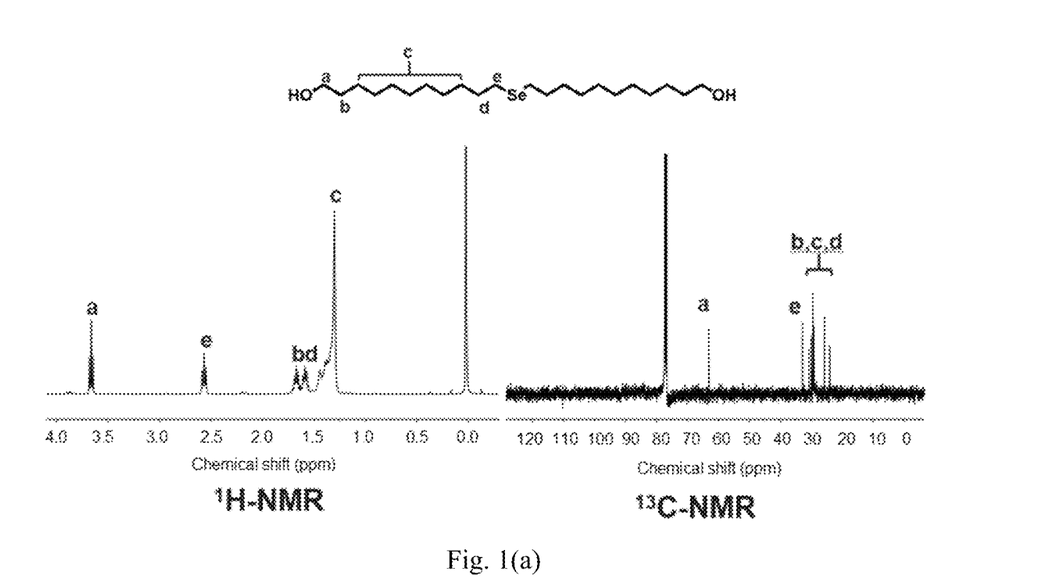
FIGS. 1(a) to 1(c) show three molecular formulas of selenium-containing compounds and their corresponding $^1$H-NMR (nuclear magnetic resonance) and $^{13}$C-NMR spectra according to embodiments of the present disclosure.

$^1$H-NMR and $^{13}$C-NMR spectra are applied to measure the obtained compound, and the results are shown in FIG. 1(a).

(2) 40 μL of dibutyltin dilaurate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, which is a selenium-containing polymer based on $HO-(CH_2)_{11}-Se-(CH_2)_{11}-OH$ and TDI.

(3) 200 mg of the selenium-containing polymer was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated and the golden color of the solution faded.

(4) The precipitated gold was placed in 5 mL of tetrahydrofuran and subjected to ultrasonic vibration for 5 min to dissolve the selenium-containing polymer attached to the gold surface to obtain a high-purity gold.

Example 2

This example is different from Example 1 in the preparation of the selenium-containing polymer as follows, and the other operations are the same as Example 1.

(1) 0.400 g of hexamethylene diisocyanate (HDI) and 1.00 g of $HO-(CH_2)_{11}-Se-(CH_2)_{11}-OH$ were added into a 40 mL reaction flask, and 2 mL of dichloromethane was further added and mixed uniformly to obtain a mixture system.

(2) 80 μL of dibutyltin dilaurate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on $HO-(CH_2)_{11}-Se-(CH_2)_{11}-OH$ and HDI.

Example 3

This example is different from Example 1 in the preparation of the selenium-containing polymer as follows, and the other operations are the same as Example 1.

(1) 0.528 g of isophorone diisocyanate (IPDI) and 1.00 g of $HO-(CH_2)_{11}-Se-(CH_2)_{11}-OH$ were added into a 40 mL reaction flask, and 2 mL of dichloromethane was further added and mixed uniformly to obtain a mixture system.

(2) 100 μL of dibutyltin dilaurate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on $HO-(CH_2)_{11}-Se-(CH_2)_{11}-OH$ and IPDI.

Example 4

This example is different from Example 1 in the preparation of the selenium-containing polymer as follows, and the other operations are the same as Example 1.

(1) 0.594 g of methylenediphenyl diisocyanate (MDI) and 1.00 g of $HO-(CH_2)_{11}-Se-(CH_2)_{11}-OH$ were added into a 40 mL reaction flask, and 2 mL of dichloromethane was further added and mixed uniformly to obtain a mixture system.

(2) 20 μL of dibutyltin dilaurate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_{11}$—Se—$(CH_2)_{11}$—OH and MDI.

Examples 5-8: Extracting and Enriching Gold Based on a Selenium-Containing Polymer Prepared from a Compound of HO—$(CH_2)_5$—Se—$(CH_2)_5$—OH and Isocyanate

Example 5

(1) 0.688 g of TDI and 1.00 g of HO—$(CH_2)_5$—Se—$(CH_2)_5$—OH were added into a 40 mL reaction flask, and 2 mL of tetrahydrofuran was further added and mixed uniformly to obtain a mixture system. The compound of HO—$(CH_2)_5$—Se—$(CH_2)_5$—OH was prepared as follows.

0.90 g of selenium powder (11.4 mmol) and 1.80 g of sodium borohydride (23.6 mmol) were added to a 250 mL round bottom flask, and 5 mL of absolute ethanol was added slowly and dropwise into the flask in an ice-water bath. After the reaction was moderated, 15 mL of absolute ethanol was added slowly and dropwise. After the reaction system stopped generating gas, the flask was sealed with a rubber stopper, and nitrogen was introduced into the system for 3 min to remove the gas in the flask. After this, a brownish gray transparent solution was obtained and stood at room temperature for use. 3.34 g of 5-bromo-1-pentanol was dissolved in 20 mL of tetrahydrofuran to obtain a 5-bromo-1-pentanol solution. With stirring, the prepared 5-bromo-1-pentanol solution and additional 10 mL of tetrahydrofuran were injected into the brownish gray transparent solution in sequence, and heated for reaction at 50° C. for 8 h. After the reaction, the reaction device was cooled to room temperature, and solution obtained from the reaction device was filtered through an organic phase filter membrane to remove unreacted selenium powder in the system and borax precipitated during the reaction. Ethanol and tetrahydrofuran were removed by rotary evaporation, and dichloromethane and deionized water were added to the remaining mixture. The mixture was separated to collect organic phase. The aqueous phase was washed with dichloromethane for one time, and the organic phases were combined. After further washing with a small amount of saturated sodium chloride solution, organic phase solution was collected. Anhydrous sodium sulfate was added for drying and removed by filtration, and dichloromethane was removed by rotary evaporation.

After lyophilization under a vacuum condition, the compound of HO—$(CH_2)_5$—Se—$(CH_2)_5$—OH was obtained.

(2) 40 μL of stannous octoate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, which is a selenium-containing polymer based on HO—$(CH_2)_5$—Se—$(CH_2)_5$—OH and TDI.

(3) 200 mg of the selenium-containing polymer was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated.

(4) The precipitated gold was placed in 5 mL of tetrahydrofuran and subjected to ultrasonic vibration for 5 min to dissolve the selenium-containing polymer attached to the gold surface to obtain a high-purity gold.

Example 6

This example is different from Example 5 in the preparation of the selenium-containing polymer as follows, and the other operations are the same as Example 5.

(1) 0.665 g of HDI and 1.00 g of HO—$(CH_2)_5$—Se—$(CH_2)_5$—OH were added into a 40 mL reaction flask, and 2 mL of tetrahydrofuran was further added and mixed uniformly to obtain a mixture system.

(2) 80 μL of dibutyltin dilaurate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_5$—Se—$(CH_2)_5$—OH and HDI.

Example 7

This example is different from Example 5 in the preparation of the selenium-containing polymer as follows, and the other operations are the same as Example 5.

(1) 0.879 g of IPDI and 1.00 g of HO—$(CH_2)_5$—Se—$(CH_2)_5$—OH were added into a 40 mL reaction flask, and 2 mL of tetrahydrofuran was further added and mixed uniformly to obtain a mixture system.

(2) 100 μL of stannous octoate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_5$—Se—$(CH_2)_5$—OH and IPDI.

Example 8

This example is different from Example 5 in the preparation of the selenium-containing polymer as follows, and the other operations are the same as Example 5.

(1) 0.989 g of MDI and 1.00 g of HO—$(CH_2)_5$—Se—$(CH_2)_5$—OH were added into a 40 mL reaction flask, and 2 mL of tetrahydrofuran was further added and mixed uniformly to obtain a mixture system.

(2) 20 μL of stannous octoate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_5$—Se—$(CH_2)_5$—OH and MDI.

Examples 9-12: Extracting and Enriching Gold Based on a Selenium-Containing Polymer Prepared from a Compound of HO—$(CH_2)_3$—Se—$(CH_2)_3$—OH and Isocyanate

Example 9

(1) 0.884 g of TDI and 1.00 g of HO—$(CH_2)_3$—Se—$(CH_2)_3$—OH were added into a 40 mL reaction flask, and 2 mL of acetone was further added and mixed uniformly to obtain a mixture system. The compound of HO—$(CH_2)_3$—Se—$(CH_2)_3$—OH was prepared as follows.

0.90 g of selenium powder (11.4 mmol) and 1.80 g of sodium borohydride (23.6 mmol) were added to a 250 mL round bottom flask, and 5 mL of absolute ethanol was added slowly and dropwise into the flask in an ice-water bath. After the reaction was moderated, 15 mL of absolute ethanol was added slowly and dropwise. After the reaction system stopped generating gas, the flask was sealed with a rubber stopper, and nitrogen was introduced into the system for 3 min to remove the gas in the flask. After this, a brownish gray transparent solution was obtained and stood at room temperature for use. 2.78 g of 3-bromo-1-propanol was dissolved in 20 mL of tetrahydrofuran to obtain a 3-bromo-1-propanol solution. With stirring, the prepared 3-bromo-1-propanol solution and additional 10 mL of tetrahydrofuran were injected into the brownish gray transparent solution in sequence, and heated for reaction at 50° C. for 8 h. After the reaction, the reaction device was cooled to room temperature, and solution obtained from the reaction device was filtered through an organic phase filter membrane to remove unreacted selenium powder in the system and borax precipitated during the reaction. Ethanol and tetrahydrofuran were removed by rotary evaporation, and dichloromethane and deionized water were added to the remaining mixture. The mixture was separated to collect organic phase. The aqueous phase was washed with dichloromethane for one time, and the organic phases were combined. After further washing with a small amount of saturated sodium chloride solution, organic phase solution was collected. Anhydrous sodium sulfate was added for drying and removed by filtration, and dichloromethane was removed by rotary evaporation. After lyophilization under a vacuum condition, the compound of HO—$(CH_2)_3$—Se—$(CH_2)_3$—OH was obtained.

Figure 1B:
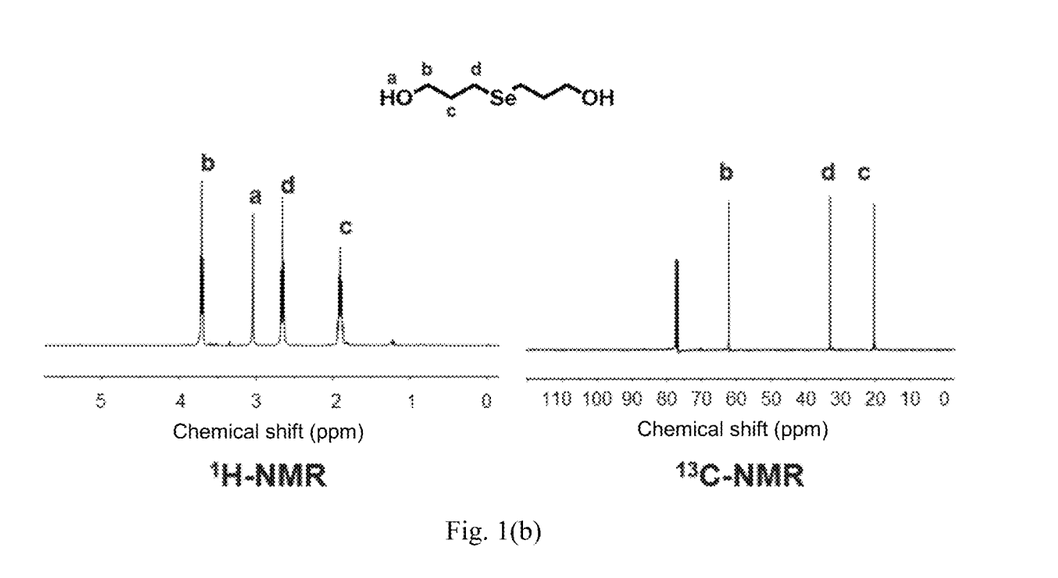

$^1$H-NMR and $^{13}$C-NMR spectra are applied to measure the obtained compound, and the results are shown in FIG. 1(b).

(2) 40 µL of dibutyltin diacetate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, which is a selenium-containing polymer based on HO—$(CH_2)_3$—Se—$(CH_2)_3$—OH and TDI.

(3) 200 mg of the selenium-containing polymer was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated.

(4) The precipitated gold was placed in 5 mL of tetrahydrofuran and subjected to ultrasonic vibration for 5 min to dissolve the selenium-containing polymer attached to the gold surface to obtain a high-purity gold.

Example 10

This example is different from Example 9 in the preparation of the selenium-containing polymer as follows, and the other operations are the same as Example 9.

(1) 0.854 g of HDI and 1.00 g of HO—$(CH_2)_3$—Se—$(CH_2)_3$—OH were added into a 40 mL reaction flask, and 2 mL of acetone was further added and mixed uniformly to obtain a mixture system.

(2) 80 µL of dibutyltin diacetate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_3$—Se—$(CH_2)_3$—OH and HDI.

Example 11

This example is different from Example 9 in the preparation of the selenium-containing polymer as follows, and the other operations are the same as Example 9.

(1) 1.13 g of IPDI and 1.00 g of HO—$(CH_2)_3$—Se—$(CH_2)_3$—OH were added into a 40 mL reaction flask, and 2 mL of acetone was further added and mixed uniformly to obtain a mixture system.

(2) 100 µL of dibutyltin diacetate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_3$—Se—$(CH_2)_3$—OH and IPDI.

Example 12

This example is different from Example 9 in the preparation of the selenium-containing polymer as follows, and the other operations are the same as Example 9.

(1) 1.27 g of MDI and 1.00 g of HO—$(CH_2)_3$—Se—$(CH_2)_3$—OH were added into a 40 mL reaction flask, and 2 mL of acetone was further added and mixed uniformly to obtain a mixture system.

(2) 20 µL of dibutyltin diacetate was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_3$—Se—$(CH_2)_3$—OH and MDI.

Examples 13-16: Extracting and Enriching Gold Based on a Selenium-Containing Polymer Prepared from a Compound of HO—$(CH_2)_2$—Se—$(CH_2)_2$—OH and Isocyanate Example 13

(1) 1.03 of TDI and 1.00 g of HO—$(CH_2)_2$—Se—$(CH_2)_2$—OH were added into a 40 mL reaction flask, and 2.5 mL of a mixture of dichloromethane, tetrahydrofuran and n-hexane in a volume ratio of 1:1:0.5 was further added and mixed uniformly to obtain a mixture system. The compound of HO—$(CH_2)_2$—Se—$(CH_2)_2$—OH was prepared as follows.

0.90 g of selenium powder (11.4 mmol) and 1.80 g of sodium borohydride (23.6 mmol) were added to a 250 mL round bottom flask, and 5 mL of absolute ethanol was added slowly and dropwise into the flask in an ice-water bath. After the reaction was moderated, 15 mL of absolute ethanol was added slowly and dropwise. After the reaction system stopped generating gas, the flask was sealed with a rubber stopper, and nitrogen was introduced into the system for 3 min to remove the gas in the flask. After this, a brownish gray transparent solution was obtained and stood at room temperature for use. 2.50 g of 2-bromoethanol was dissolved in 20 mL of tetrahydrofuran to obtain a 2-bromoethanol solution. With stirring, the prepared 2-bromoethanol solution and additional 10 mL of tetrahydrofuran were injected into the brownish gray transparent solution in sequence, and heated for reaction at 50° C. for 8 h. After the reaction, the reaction device was cooled to room temperature, and solution obtained from the reaction device was filtered through an organic phase filter membrane to remove unreacted selenium powder in the system and borax precipitated during the reaction. Ethanol and tetrahydrofuran were removed by rotary evaporation, and dichloromethane and deionized water were added to the remaining mixture. The mixture was separated to collect organic phase. The aqueous phase was washed with dichloromethane for one time, and the organic phases were combined. After further washing with a small amount of saturated sodium chloride solution, organic phase solution was collected. Anhydrous sodium sulfate was added for drying and removed by filtration, and dichloromethane was removed by rotary evaporation. After lyophilization under a vacuum condition, the compound of HO—$(CH_2)_2$—Se—$(CH_2)_2$—OH was obtained.

Figure 1C:
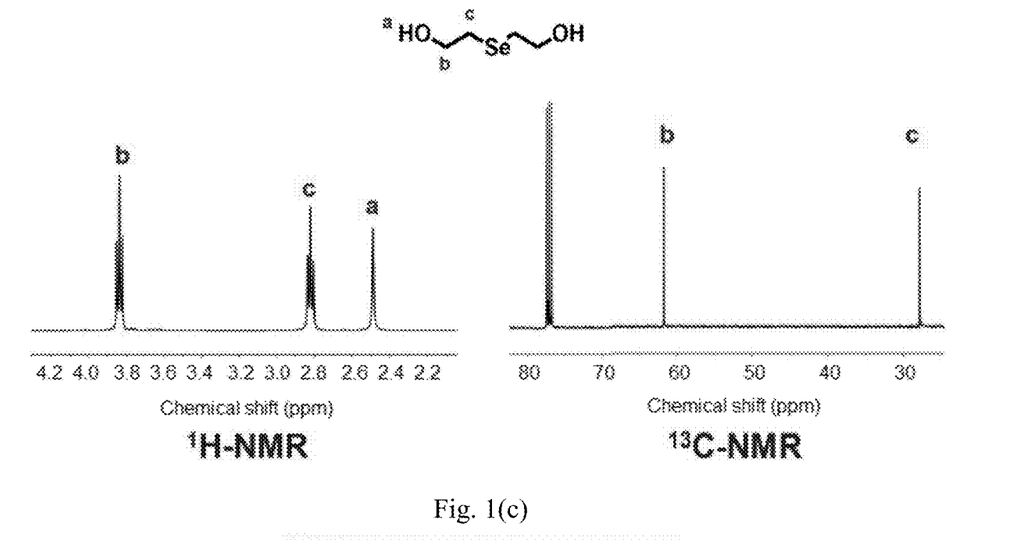

$^1$H-NMR and $^{13}$C-NMR spectra are applied to measure the obtained compound, and the results are shown in FIG. 1(c).

(2) 40 µL of bis(dodecylthio)dibutyltin was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, which is a selenium-containing polymer based on HO—$(CH_2)_2$—Se—$(CH_2)_2$—OH and TDI.

(3) 200 mg of the selenium-containing polymer was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated and the golden color of the solution faded.

(4) The precipitated gold was placed in 5 mL of tetrahydrofuran and subjected to ultrasonic vibration for 5 min to dissolve the selenium-containing polymer attached to the gold surface to obtain a high-purity gold.

Example 14

This example is different from Example 13 in the preparation of the selenium-containing polymer as follows, and the other operations are the same as Example 13.

(1) 0.995 g of HDI and 1.00 g of HO—$(CH_2)_2$—Se—$(CH_2)_2$—OH were added into a 40 mL reaction flask, and 2.5 mL of a mixture of dichloromethane, tetrahydrofuran and n-hexane in a volume ratio of 1:1:0.5 was further added and mixed uniformly to obtain a mixture system.

(2) 80 µL of bis(dodecylthio)dibutyltin was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_2$—Se—$(CH_2)_2$—OH and HDI.

Example 15

This example is different from Example 13 in the preparation of the selenium-containing polymer as follows, and the other operations are the same as Example 13.

(1) 1.32 g of IPDI and 1.00 g of HO—$(CH_2)_2$—Se—$(CH_2)_2$—OH were added into a 40 mL reaction flask, and 2.5 mL of a mixture of dichloromethane, tetrahydrofuran and n-hexane in a volume ratio of 1:1:0.5 was further added and mixed uniformly to obtain a mixture system.

(2) 100 µL of bis(dodecylthio)dibutyltin was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_2$—Se—$(CH_2)_2$—OH and IPDI.

Example 16

This example is different from Example 13 in the preparation of the selenium-containing polymer as follows, and the other operations are the same as Example 13.

(1) 1.48 g of MDI and 1.00 g of HO—$(CH_2)_2$—Se—$(CH_2)_2$—OH were added into a 40 mL reaction flask, and 2.5 mL of a mixture of dichloromethane, tetrahydrofuran and n-hexane in a volume ratio of 1:1:0.5 was further added and mixed uniformly to obtain a mixture system.

(2) 20 µL of bis(dodecylthio)dibutyltin was added to the reaction flask containing the mixture system, and the mixture system was stirred at 1000 r/min for 30 min to obtain a viscous liquid. The viscous liquid was placed in an oven at 70° C. to remove the solvent, a solid taken out from the oven was grinded to obtain a pale yellow powder, i.e., a selenium-containing polymer based on HO—$(CH_2)_2$—Se—$(CH_2)_2$—OH and MDI.

Examples 17-20: Extracting and Enriching Gold Based on a Selenium-Containing Porous Material Prepared from a Compound of HO—$(CH_2)_{11}$—Se—$(CH_2)_{11}$—OH and Isocyanate Example 17

(1) 0.83 g of TDI, 1.00 g of HO—$(CH_2)_{11}$—Se—$(CH_2)_{11}$—OH and 0.268 g of glycerine were added into a 40 mL reaction flask, and 2 mL of dichloromethane was further added and mixed uniformly to obtain a mixture system. The preparation of HO—$(CH_2)_{11}$—Se—$(CH_2)_{11}$—OH in this Example is the same as that in Example 1.

(2) 40 µL of dibutyltin dilaurate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow porous material was obtained. In this way, the selenium-containing porous material was prepared by the one-pot method with isocyanate.

(3) 200 mg of the selenium-containing porous material was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated and the golden color of the solution faded.

(4) The precipitated gold was calcined at 600° C. in a muffle furnace for 5 h to remove the selenium-containing porous material attached to gold surface to obtain a high-purity gold.

Example 18

This example is different from Example 17 in the preparation of the selenium-containing porous material as follows, and the other operations are the same as Example 17.

(1) 0.81 g of HDI, 1.00 g of HO—$(CH_2)_{11}$—Se—$(CH_2)_{11}$—OH and 0.268 g of glycerine were added into a 40 mL reaction flask, and 2 mL of dichloromethane was further added and mixed uniformly to obtain a mixture system.

(2) 80 μL of dibutyltin dilaurate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow porous material was obtained.

Example 19

This example is different from Example 17 in the preparation of the selenium-containing porous material as follows, and the other operations are the same as Example 17.

(1) 1.07 g of IPDI, 1.00 g of HO—$(CH_2)_{11}$—Se—$(CH_2)_{11}$—OH and 0.268 g of glycerine were added into a 40 mL reaction flask, and 2 mL of dichloromethane was further added and mixed uniformly to obtain a mixture system.

(2) 100 μL of dibutyltin dilaurate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow porous material was obtained.

Example 20

This example is different from Example 17 in the preparation of the selenium-containing porous material as follows, and the other operations are the same as Example 17.

(1) 1.20 g of MDI, 1.00 g of HO—$(CH_2)_{11}$—Se—$(CH_2)_{11}$—OH and 0.268 g of glycerine were added into a 40 mL reaction flask, and 2 mL of dichloromethane was further added and mixed uniformly to obtain a mixture system.

(2) 20 μL of dibutyltin dilaurate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow porous material was obtained.

Examples 21-24: Extracting and Enriching Gold Based on a Selenium-Containing Porous Material Prepared from a Compound of HO—$(CH_2)_5$—Se—$(CH_2)_5$—OH and Isocyanate Example 21

(1) 1.39 g of TDI, 1.00 g of HO—$(CH_2)_5$—Se—$(CH_2)_5$—OH and 0.721 g of triethanolamine were added into a 40 mL reaction flask, and 2 mL of tetrahydrofuran was further added and mixed uniformly to obtain a mixture system. The preparation of HO—$(CH_2)_5$—Se—$(CH_2)_5$—OH in this Example is the same as that in Example 5.

(2) 40 μL of stannous octoate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

(3) 200 mg of the selenium-containing porous material was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated and the golden color of the solution faded.

(4) The precipitated gold was calcined at 750° C. in a muffle furnace for 4 h to remove the selenium-containing porous material attached to gold surface to obtain a high-purity gold.

Example 22

This example is different from Example 21 in the preparation of the selenium-containing porous material as follows, and the other operations are the same as Example 21.

(1) 1.34 g of HDI, 1.00 g of HO—$(CH_2)_5$—Se—$(CH_2)_5$—OH and 0.721 g of triethanolamine were added into a 40 mL reaction flask, and 2 mL of tetrahydrofuran was further added and mixed uniformly to obtain a mixture system. The preparation of HO—$(CH_2)_5$—Se—$(CH_2)_5$—OH in this Example is the same as that in Example 5.

(2) 80 μL of stannous octoate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Example 23

This example is different from Example 21 in the preparation of the selenium-containing porous material as follows, and the other operations are the same as Example 21.

(1) 1.78 g of IPDI, 1.00 g of HO—$(CH_2)_5$—Se—$(CH_2)_5$—OH and 0.721 g of triethanolamine were added into a 40 mL reaction flask, and 2 mL of tetrahydrofuran was further added and mixed uniformly to obtain a mixture system. The preparation of HO—$(CH_2)_5$—Se—$(CH_2)_5$—OH in this Example is the same as that in Example 5.

(2) 100 μL of stannous octoate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Example 24

This example is different from Example 21 in the preparation of the selenium-containing porous material as follows, and the other operations are the same as Example 21.

(1) 2.00 g of MDI, 1.00 g of HO—$(CH_2)_5$—Se—$(CH_2)_5$—OH and 0.721 g of triethanolamine were added into a 40 mL reaction flask, and 2 mL of tetrahydrofuran was further added and mixed uniformly to obtain a mixture system.

(2) 20 μL of stannous octoate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Examples 25-28: Extracting and Enriching Gold Based on a Selenium-Containing Porous Material Prepared from a Compound of HO—$(CH_2)_3$—Se—$(CH_2)_3$—OH and Isocyanate Example 25

(1) 2.08 g of TDI, 1.00 g of HO—$(CH_2)_3$—Se—$(CH_2)_3$—OH and 0.634 g of pentaerythritol were added into a 40 mL reaction flask, and 2 mL of acetone was further added and mixed uniformly to obtain a mixture system. The preparation of HO—$(CH_2)_3$—Se—$(CH_2)_3$—OH in this Example is the same as that in Example 9.

Figure 2:
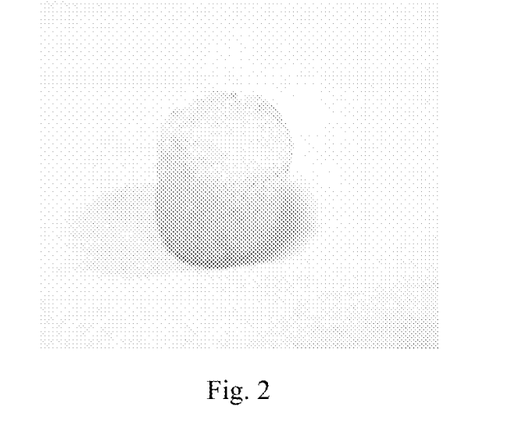
FIG. 2 is a photograph of a selenium-containing porous material prepared in Example 25 of the present disclosure.

(2) 40 μL of dibutyltin diacetate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained as shown in FIG. 2.

(3) 200 mg of the selenium-containing porous material was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated and the golden color of the solution faded.

Figure 3A:
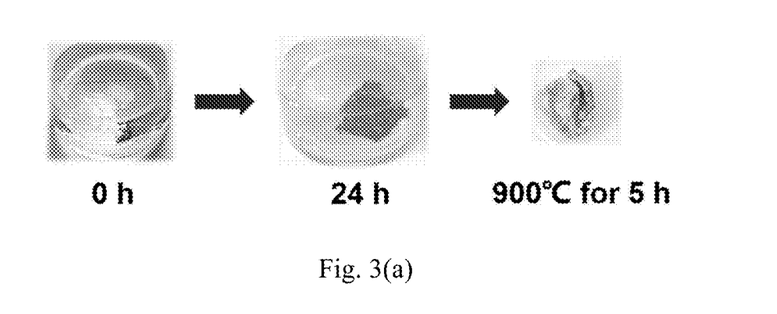
FIG. 3(a) is a diagram showing gold changing from being in a free state to a precipitate according to embodiments of the present disclosure.

(4) The precipitated gold was calcined at 900° C. in a muffle furnace for 5 h to remove the selenium-containing porous material attached to gold surface to obtain a high-purity gold. FIG. 3(a) shows the operations (3) and (4).

Example 26

This example is different from Example 25 in the preparation of the selenium-containing porous material as follows, and the other operations are the same as Example 25.

(1) 2.01 g of HDI, 1.00 g of HO—$(CH_2)_3$—Se—$(CH_2)_3$—OH and 0.634 g of pentaerythritol were added into a 40 mL reaction flask, and 2 mL of acetone was further added and mixed uniformly to obtain a mixture system.

(2) 80 μL of dibutyltin diacetate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Example 27

This example is different from Example 25 in the preparation of the selenium-containing porous material as follows, and the other operations are the same as Example 25.

(1) 2.66 g of IPDI, 1.00 g of HO—$(CH_2)_3$—Se—$(CH_2)_3$—OH and 0.634 g of pentaerythritol were added into a 40 mL reaction flask, and 2 mL of acetone was further added and mixed uniformly to obtain a mixture system.

(2) 100 μL of dibutyltin diacetate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Example 28

This example is different from Example 25 in the preparation of the selenium-containing porous material as follows, and the other operations are the same as Example 25.

(1) 2.99 g of MDI, 1.00 g of HO—$(CH_2)_3$—Se—$(CH_2)_3$—OH and 0.634 g of pentaerythritol were added into a 40 mL reaction flask, and 2 mL of acetone was further added and mixed uniformly to obtain a mixture system.

(2) 20 μL of dibutyltin diacetate was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Examples 29-32: Extracting and Enriching Gold Based on a Selenium-Containing Porous Material Prepared from a Compound of HO—$(CH_2)_2$—Se—$(CH_2)_2$—OH and Isocyanate Example 29

(1) 1.78 g of TDI, 1.00 g of HO—$(CH_2)_2$—Se—$(CH_2)_2$—OH and 0.874 g of a mixture of glycerine and triethanolamine in a mass ratio of 1:1 were added into a 40 mL reaction flask, and 2.5 mL of a mixture of dichloromethane, tetrahydrofuran and n-hexane in a volume ratio of 1:1:0.5 was further added and mixed uniformly to obtain a mixture system. The preparation of HO—$(CH_2)_2$—Se—$(CH_2)_2$—OH in this Example is the same as that in Example 13.

(2) 40 μL of bis(dodecylthio)dibutyltin was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

(3) 200 mg of the selenium-containing porous material was immersed into a reaction flask containing 10 mL chloroauric acid solution having a concentration of 1000 ppm. After sealing, the reaction was carried out at 37° C. in a constant temperature shaker in the dark for 24 h. During the reaction, gold was precipitated and the golden color of the solution faded.

(4) The precipitated gold was calcined at 800° C. in a muffle furnace for 3 h to remove the selenium-containing porous material attached to gold surface to obtain a high-purity gold.

Example 30

This example is different from Example 29 in the preparation of the selenium-containing porous material as follows, and the other operations are the same as Example 29.

(1) 1.72 g of HDI, 1.00 g of HO—$(CH_2)_2$—Se—$(CH_2)_2$—OH and 0.874 g of a mixture of glycerine and triethanolamine in a mass ratio of 1:1 were added into a 40 mL reaction flask, and 2.5 mL of a mixture of dichloromethane, tetrahydrofuran and n-hexane in a volume ratio of 1:1:0.5 was further added and mixed uniformly to obtain a mixture system.

(2) 80 μL of bis(dodecylthio)dibutyltin was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Example 31

This example is different from Example 29 in the preparation of the selenium-containing porous material as follows, and the other operations are the same as Example 29.

(1) 2.28 g of IPDI, 1.00 g of HO—$(CH_2)_2$—Se—$(CH_2)_2$—OH and 0.874 g of a mixture of glycerine and triethanolamine in a mass ratio of 1:1 were added into a 40 mL reaction flask, and 2.5 mL of a mixture of dichloromethane, tetrahydrofuran and n-hexane in a volume ratio of 1:1:0.5 was further added and mixed uniformly to obtain a mixture system.

(2) 100 μL of bis(dodecylthio)dibutyltin was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Example 32

This example is different from Example 29 in the preparation of the selenium-containing porous material as follows, and the other operations are the same as Example 29.

(1) 2.57 g of MDI, 1.00 g of HO—$(CH_2)_2$—Se—$(CH_2)_2$—OH and 0.874 g of a mixture of glycerine and triethanolamine in a mass ratio of 1:1 were added into a 40 mL reaction flask, and 2.5 mL of a mixture of dichloromethane, tetrahydrofuran and n-hexane in a volume ratio of 1:1:0.5 was further added and mixed uniformly to obtain a mixture system.

(2) 20 μL of bis(dodecylthio)dibutyltin was added to the reaction flask containing the mixture system, and the mixture system was stirred at 1000 r/min for 1 min to generate a large amount of bubbles in the system. The system was placed in an oven at 70° C. for foaming and drying for 3 h, and a pale yellow selenium-containing porous material was obtained.

Tests for Validity Verification

1. Test of Au Extraction Efficiency of Selenium-Containing Porous Material

Figure 3B:
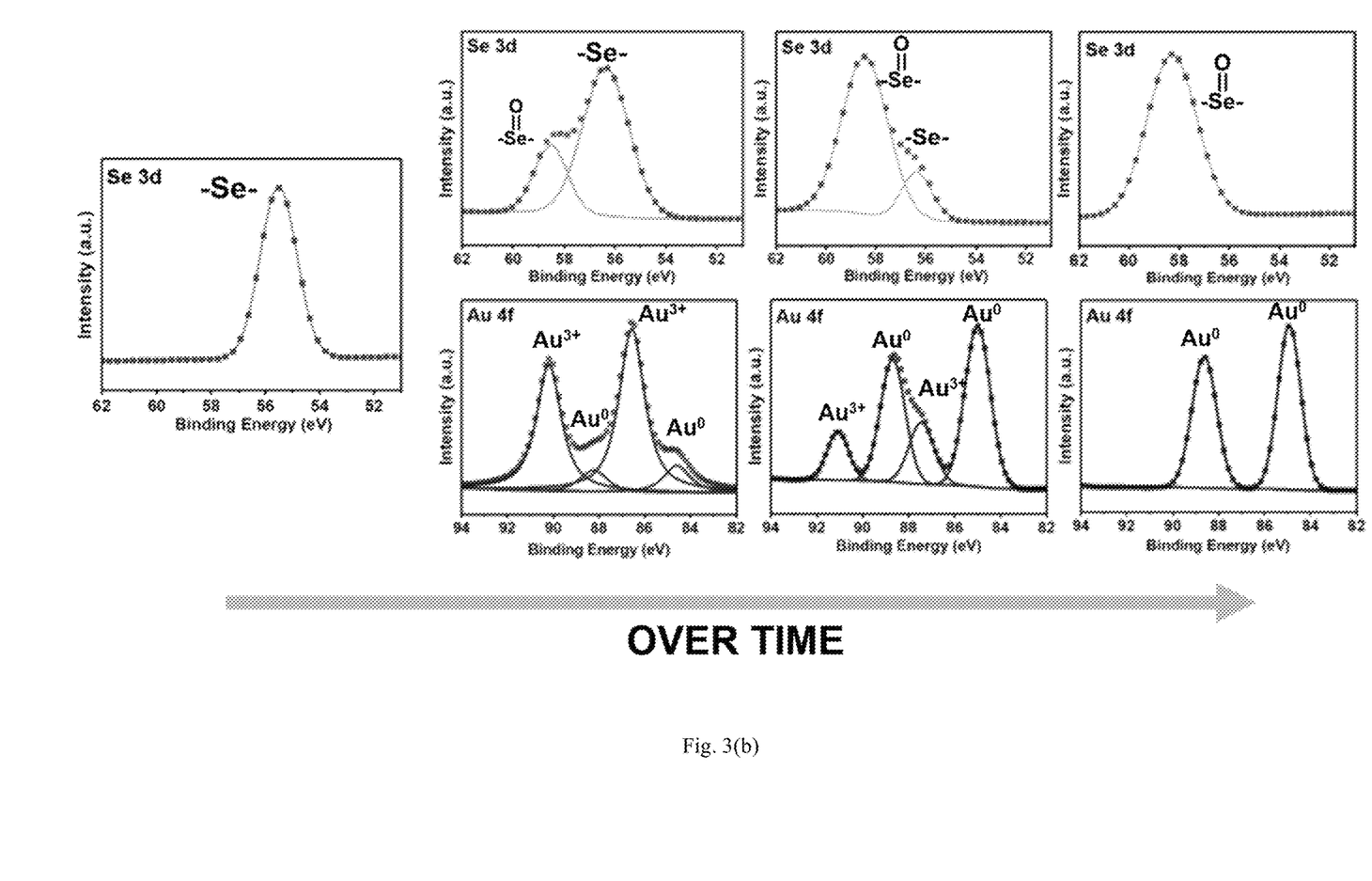
FIG. 3(b) is a diagram showing chemical changes of selenium and gold characterized by X-ray photoelectron spectroscopy and proving gold changing from being in a free state to a precipitate according to embodiments of the present disclosure.
Figure 4:
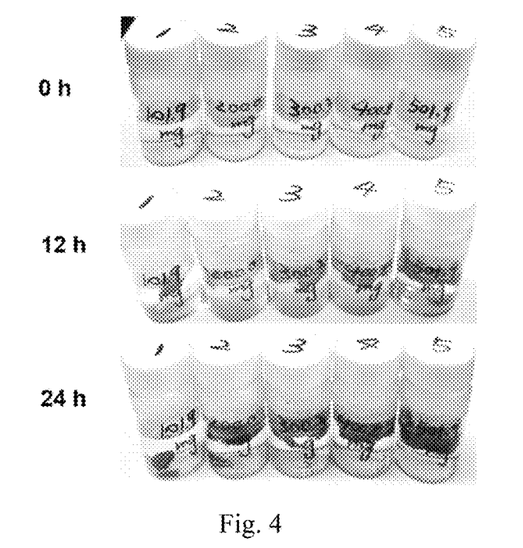
FIG. 4 is a diagram showing selenium-containing porous material adsorbing free gold in a solution within 24 hours according to embodiments of the present disclosure.

Approximately 100, 200, 300, 400, and 500 mg of the selenium-containing porous material was weighted and immersed in 10 mL chloroauric acid solution having a concentration of approximately 1000 ppm in a reaction flask, respectively (as shown in FIG. 4). After sealing, the reaction was carried out at 37° C. in a constant temperature shaker in the dark for 24 h. During the reaction, the golden yellow of the solution gradually faded. The selenium-containing porous material gradually changed from pale yellow to dark brown (as shown in FIG. 3(a)). After the reaction, Au concentration of the solution before and after the reaction was detected by inductively coupled plasma mass spectrometry. The process was monitored by X-ray photoelectron spectroscopy (as shown in FIG. 3(b)).

The Au extraction efficiency of the selenium-containing porous material is calculated by the following formula:

$$\text{Au extraction efficiency} = (c(Au)_{initial} - c(Au)_{final})/c(Au)_{initial} * 100\%,$$

where $c(Au)_{initial}$ and $c(Au)_{final}$ represent an initial concentration and a final concentration of Au in the solution, respectively.

Table 1 shows results of the Au extraction efficiency of the selenium-containing porous material as follows.

TABLE 1

| Sample Weight (mg) | $c(Au)_{Initial}$ (mg/L) | $c(Au)_{Final}$ (mg/L) | $V_{solution}$ (mL) | Yield (%) |
|---|---|---|---|---|
| 100.0 | 1152.7 | 83.980 | 10.0 | 92.710 |
| 200.0 | 1152.7 | 0.110 | 10.0 | 99.990 |
| 300.0 | 1152.7 | 0.048 | 10.0 | 99.996 |
| 400.0 | 1152.7 | 0.046 | 10.0 | 99.996 |
| 500.0 | 1152.7 | 0.130 | 10.0 | 99.989 |

It can be seen from Table 1, the selenium-containing porous material of the present disclosure realizes a high Au extraction efficiency.

2. Test of Au Extraction Capacity of Selenium-Containing Porous Material

Approximately 55 mg of the selenium-containing porous material was weight and immersed in 10 mL chloroauric acid solution having a concentration of approximately 1000 ppm in a reaction flask. After sealing, the reaction was carried out at 37° C. in a constant temperature shaker in the dark. 1 mL of solution in the reaction flask was taken with a pipette gun at 12 h and 24 h, diluted to 5 mL with deionized water and transferred to a 10 mL centrifuge tube, respectively. It can be observed that during the reaction, the golden yellow of the solution gradually faded, and the selenium-containing porous material gradually changed from pale yellow to dark brown.

Figure 5:
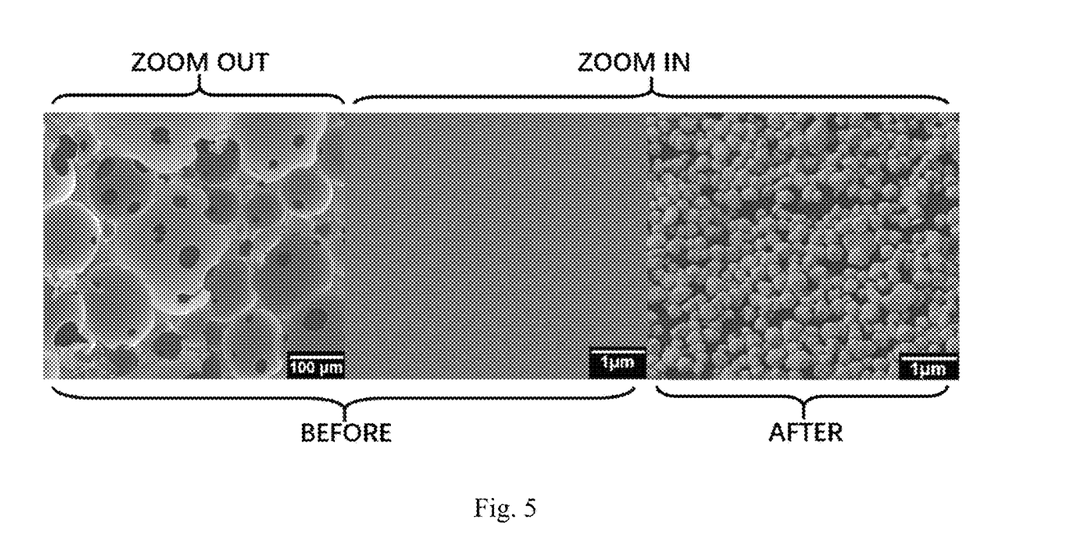
FIG. 5 shows scanning electron microscope images of a selenium-containing porous material before and after adsorbing gold according to embodiments of the present disclosure.

As shown in FIG. 5, before the reaction, it is clearly observed that the selenium-containing material prepared by the present method has the porous structure in a low magnification image, and a uniform surface in a high magnification image. Moreover, after the reaction, a large amount of gold is observed to be adsorbed on the surface of the selenium-containing porous material.

In addition, the Au concentration of the solution before and after the reaction is detected by inductively coupled plasma mass spectrometry. The Au extraction capacity of the selenium-containing porous material is calculated by the following formula:

$$\text{Au extraction capacity} = (c(Au)_{initial} - c(Au)_{final}) * V_{solution}/W,$$

where $c(Au)_{initial}$ and $c(Au)_{final}$ represent an initial concentration and a final concentration of Au in the solution, respectively, $V_{solution}$ represents a volume of the solution, and W represents a weight of the selenium-containing porous material sample.

Table 2 shows results of the Au extraction capacity of the selenium-containing porous material as follows.

TABLE 2

| Sample Weight (mg) | $c(Au)_{Initial}$ (mg/L) | $c(Au)_{Final}$ (mg/L) | $V_{solution}$ (mL) | Capacity (mg/g) |
|---|---|---|---|---|
| 58.0 | 1152.7 | 55.1 | 10.0 | 189.2 |

3. Study on Au Extraction Kinetics of Selenium-Containing Porous Material

Approximately 55 mg of the selenium-containing porous material was weight and immersed in 20 mL of chloroauric acid solution having a concentration of approximately 200 ppm in a reaction flask. After sealing, the reaction was carried out at 37° C. in a constant temperature shaker in the dark. 200 μL of the solution in the reaction flask was taken with a pipette gun at 30 min, 45 min, 60 min, 2 h, 6 h, 10 h, 12 h and 24 h, diluted to 5 mL with deionized water and transferred to a 10 mL centrifuge tube, respectively. It can be observed that during the reaction the golden yellow of the solution gradually faded, and the selenium-containing porous material gradually changed from pale yellow to dark brown.

Figure 6:
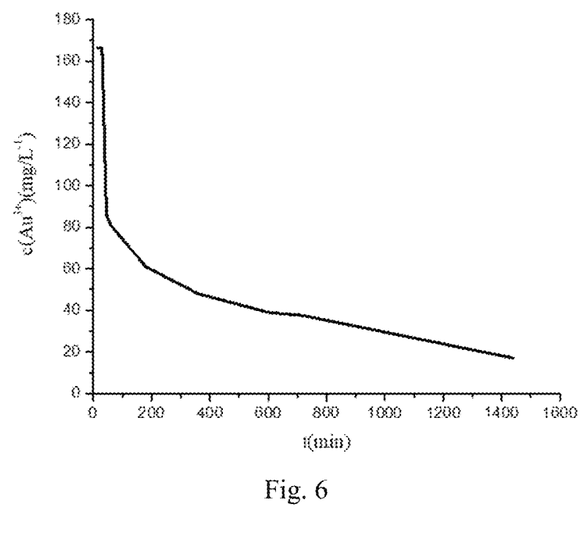
FIG. 6 is a graph showing a variation of gold concentration during 24 hours measured by an inductively coupled plasma mass spectrometry according to embodiments of the present disclosure.

After the reaction, the Au concentration of the solution at each time point is detected by inductively coupled plasma mass spectrometry and FIG. 6 shows an Au concentration curve drawn according to the detected data.

4. Test of Au Extraction Selectivity of Selenium-Containing Porous Material in a Multi-Ion System Approximately 200 mg of the selenium-containing porous material was weight and immersed in 10 mL of a waste CPU leaching solution (containing ions of $Cu^{2+}$ and $Ni^{3+}$ which may be interfered with Au extraction) in a reaction flask. After sealing, the reaction was carried out at 37° C. in a constant temperature shaker in the dark. After the reaction, Cu, Ni and Au concentrations of the solution were detected by inductively coupled plasma mass spectrometry before and after the reaction.

Cu, Ni and Au extraction efficiencies of the selenium-containing porous material are calculated by the following formula:

Element extraction efficiency=$(C_{initial}-C_{final})/C_{initial}*100\%$, where $C_{initial}$ and $C_{final}$ represent an initial concentration and a final concentration of an element in the solution, respectively.

Table 3 shows results of the element extraction efficiencies of the selenium-containing porous material as follows.

TABLE 3

| | Element | | |
|---|---|---|---|
| | Cu | Ni | Au |
| $C_{Initial}$ (mg/L) | 640.45 | 29.48 | 4.47 |
| $C_{Final}$ (mg/L) | 668.1 | 31.7 | 0.18 |
| Efficacy (%) | 0 | 0 | 95.97 |

It can be seen from Table 3 that the selenium-containing porous material of the present disclosure has a high selectivity in extracting Au.

5. Au Purification

The selenium-containing porous material treated with electronic waste solution was placed in a muffle furnace at 900° C. and calcined for 5 h to obtain a product. The product was cooled to room temperature and washed with hydrochloric acid. After drying, the obtained product was dissolved in aqua regia to form a solution, and contents of Au, Cu, Ni and Se in the solution were measured by inductively coupled plasma mass spectrometry.

Au purity is calculated and shown in Table 4.

TABLE 4

| Sample | Au (mg/L) | Cu (mg/L) | Ni (mg/L) | Se (mg/L) | Purity (%) |
|---|---|---|---|---|---|
| 1 | 81.8 | <0.01 | <0.01 | <0.01 | >99.96 |
| 2 | 81.7 | <0.01 | <0.01 | <0.01 | >99.96 |
| 3 | 81.5 | <0.01 | <0.01 | <0.01 | >99.96 |

It can be seen from FIG. 4, the purity of the final product is greater than 99.96%.

In the specification, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the description, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for extracting and enriching gold with a selenide, comprising:
    mixing an isocyanate and a selenium-containing compound of a formula of HO—R—Se—R—OH in a solvent according to a mass ratio of the isocyanate to the selenium-containing compound of (0.2 to 2):1 to obtain a mixture system with a mass concentration of the selenium-containing compound of 0.1 to 1 g/mL, where R is selected from linear or branched $C_2$ to $C_{11}$ alkylene groups;
    adding a tin-based catalyst in an amount of 20 to 100 μL per 1 g of the selenium-containing compound into the mixture system to activate a reaction, drying the mixture system after the reaction, and obtaining a powdery selenium-containing polymer by grinding;

immersing the selenium-containing polymer in an aqueous solution containing gold ions to allow gold to be extracted from the aqueous solution; and removing the selenium-containing polymer attached to a surface of extracted gold, thereby obtaining an extracted and enriched gold.

2. The method according to claim 1, wherein the isocyanate is selected from any one of toluene diisocyanate, hexamethylene diisocyanate, methylenediphenyl diisocyanate and isophorone diisocyanate.

3. The method according to claim 1, wherein the solvent is selected from any one or more of dichloromethane, acetone, tetrahydrofuran, diethyl ether, n-hexane and n-pentane.

4. The method according to claim 1, wherein the tin-based catalyst is selected from any one or more of dibutyltin dilaurate, stannous octoate, dibutyltin diacetate and bis(dodecylthio)dibutyltin.

5. The method according to claim 1, wherein the aqueous solution containing gold ions is selected from a chloroauric acid solution or a CPU circuit board leaching solution.

6. The method according to claim 1, wherein the selenium-containing compound of the formula of HO—R—Se—R—OH is prepared by:

providing a selenium powder and sodium borohydride in a reaction device, and adding absolute ethanol in the reaction device for reaction until no gas is generated;

introducing nitrogen to remove the gas in the reaction device;

dissolving a bromine-substituted alkyl alcohol into tetrahydrofuran to obtain a bromine-substituted alkyl alcohol solution;

injecting the bromine-substituted alkyl alcohol solution into the reaction device to allow a reaction to be performed at 50° C. for 8 h to obtain the selenium-containing compound; and purifying the selenium-containing compound.

7. The method according to claim 1, further comprising:

stirring the mixture system at 1000 r/min for a period of 1 min to 30 min.

8. The method according to claim 1, wherein gold extraction is performed at 37° C. in a constant temperature shaker in the dark for 24 h.

9. The method according to claim 1, wherein removing the selenium-containing polymer attached to the surface of the extracted gold comprises:

placing the extracted gold in tetrahydrofuran; and performing an ultrasonic vibration to dissolve the selenium-containing polymer attached to the surface of the extracted gold to obtain a high-purity gold.

10. A method for extracting and enriching gold with a selenide, comprising:

mixing an isocyanate, a selenium-containing compound of a formula of HO—R—Se—R—OH and a crosslinking agent in a solvent according to a mass ratio of the isocyanate, the selenium-containing compound and the crosslinking agent of (0.6 to 3):1:(0.2 to 1) to obtain a mixture system with a mass concentration of the selenium-containing compound of 0.1 to 1 g/mL, where each R is selected from linear or branched $C_2$ to $C_{11}$ alkylene groups;

adding a tin-based catalyst in an amount of 20 to 100 μL per 1 g of the selenium-containing compound into the mixture system to activate a reaction, and obtaining a selenium-containing porous material after the reaction;

immersing the selenium-containing porous material in an aqueous solution containing gold ions to allow gold to be extracted from the aqueous solution; and removing the selenium-containing porous material attached to a surface of the extracted gold by calcination for 2 to 5 h, thereby obtaining an extracted and enriched gold.

11. The method according to claim 10, wherein the isocyanate is selected from any one of toluene diisocyanate, hexamethylene diisocyanate, methylenediphenyl diisocyanate and isophorone diisocyanate.

12. The method according to claim 10, wherein the solvent is selected from any one or more of dichloromethane, acetone, tetrahydrofuran, diethyl ether, n-hexane and n-pentane.

13. The method according to claim 10, wherein the crosslinking agent is selected from any one or more of glycerine, triethanolamine and pentaerythritol.

14. The method according to claim 10, wherein the tin-based catalyst is selected from any one or more of dibutyltin dilaurate, stannous octoate, dibutyltin diacetate and bis(dodecylthio)dibutyltin.

15. The method according to claim 10, wherein the aqueous solution containing gold ions is selected from a chloroauric acid solution or a CPU circuit board leaching solution.

16. The method according to claim 10, wherein R is selected from any group of —$CH_2CH_2$—, —$CH_2CH_2CH_2$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$— and —$(CH_2)_{11}$—.

17. The method according to claim 10, wherein the selenium-containing compound of the formula of HO—R—Se—R—OH is prepared by:

providing a selenium powder and sodium borohydride in a reaction device, and adding absolute ethanol in the reaction device for reaction until no gas is generated;

introducing nitrogen to remove the gas in the reaction device;

dissolving a bromine-substituted alkyl alcohol into tetrahydrofuran to obtain a bromine-substituted alkyl alcohol solution;

injecting the bromine-substituted alkyl alcohol solution into the reaction device to allow a reaction to be performed at 50° C. for 8 h to obtain the selenium-containing compound; and purifying the selenium-containing compound.

18. The method according to claim 10, further comprising:

stirring the mixture system at 1000 r/min for a period of 1 min to 30 min.

19. The method according to claim 10, wherein gold extraction is performed at 37° C. in a constant temperature shaker in the dark for 24 h.

20. The method according to claim 10, wherein the calcination is performed in a muffle furnace at a temperature of 550 to 1000° C.

* * * * *